(12) United States Patent
Kimura

(10) Patent No.: US 11,686,570 B2
(45) Date of Patent: Jun. 27, 2023

(54) DISPLACEMENT SENSOR AND PROFILE MEASUREMENT APPARATUS

(71) Applicant: MITUTOYO CORPORATION, Kanagawa (JP)

(72) Inventor: Akihide Kimura, Saitama (JP)

(73) Assignee: MITUTOYO CORPORATION, Kanagawa (JP)

( * ) Notice: Subject to any disclaimer, the term of this patent is extended or adjusted under 35 U.S.C. 154(b) by 0 days.

(21) Appl. No.: 17/518,954

(22) Filed: Nov. 4, 2021

(65) Prior Publication Data
US 2022/0163319 A1    May 26, 2022

(30) Foreign Application Priority Data
Nov. 24, 2020    (JP) ................................ 2020-194314

(51) Int. Cl.
*G01B 11/02*    (2006.01)
*G01B 9/02*    (2022.01)
*G01B 11/24*    (2006.01)

(52) U.S. Cl.
CPC ............ *G01B 9/02* (2013.01); *G01B 11/2441* (2013.01)

(58) Field of Classification Search
CPC .. G01B 9/02; G01B 9/02037; G01B 2290/20; G01B 11/2441; G01D 5/38; G01D 5/347; G01D 5/34746
See application file for complete search history.

(56) References Cited

U.S. PATENT DOCUMENTS

| 5,621,527 A * | 4/1997 | Kaneda | G01D 5/38 250/237 G |
| 5,661,295 A * | 8/1997 | Fukui | G01D 5/38 250/237 G |
| 5,666,196 A * | 9/1997 | Ishii | G01D 5/38 250/237 G |
| 6,995,836 B1 * | 2/2006 | Tondorf | G01S 3/782 356/138 |

(Continued)

FOREIGN PATENT DOCUMENTS

JP    4503902    7/2010

OTHER PUBLICATIONS

Changxing Zhang, Xuelin Dong, Xue Feng, and Keh-Chih Hwang, "Multiwavelength shearing interferometry for measuring the slopes, curvatures, and shapes of thin films/substrate systems," Opt. Lett. 38, 5446-5449 (2013) (Year: 2013).*

*Primary Examiner* — Tarifur R Chowdhury
*Assistant Examiner* — Jonathon Cook
(74) *Attorney, Agent, or Firm* — Greenblum & Bernstein, P.L.C.

(57) ABSTRACT

A displacement sensor includes a radiation part that irradiates a workpiece displaceable in a predetermined displacement direction with light, a light receiving part that receives a reflected light generated when the light radiated by the radiation part is reflected on the workpiece, and a fringe generation part that includes a generation means for generating fringes on a light receiving surface of the light receiving part when the light receiving part receives the reflected light from the workpiece. The fringe generation part and the light receiving part are arranged such that the fringe generation part and the light receiving part are parallel to the displacement direction, or parallel to a virtual image of the displacement direction.

15 Claims, 12 Drawing Sheets

(56) References Cited

U.S. PATENT DOCUMENTS

| | | | |
|---|---|---|---|
| 10,989,517 B2* | 4/2021 | Zalevsky | G01B 9/02 |
| 2004/0051881 A1* | 3/2004 | Holzapfel | G01D 5/34715 |
| | | | 356/616 |
| 2007/0187583 A1* | 8/2007 | Yaku | G01D 5/34715 |
| | | | 250/231.13 |
| 2009/0195792 A1* | 8/2009 | Hermann | G01D 5/38 |
| | | | 356/622 |
| 2012/0154805 A1* | 6/2012 | Holzapfel | G01D 5/38 |
| | | | 356/365 |
| 2017/0030745 A1* | 2/2017 | Kimura | G01D 5/266 |
| 2020/0011661 A1* | 1/2020 | Kimura | G01B 11/26 |
| 2020/0041252 A1* | 2/2020 | Sändig | G01B 11/14 |
| 2020/0309572 A1* | 10/2020 | Kato | G01D 5/2451 |

* cited by examiner

DISPLACEMENT SENSOR AND PROFILE MEASUREMENT APPARATUS

CROSS-REFERENCE TO RELATED APPLICATIONS

The present application claims priority to Japanese Patent Applications number 2020-194314, filed on Nov. 24, 2020. The contents of this application are incorporated herein by reference in their entirety.

BACKGROUND OF THE INVENTION

The present disclosure relates to a displacement sensor and a profile measurement apparatus.

Conventionally, a triangulation sensor has been used as a displacement sensor for detecting displacement of a workpiece. In the triangulation sensor, first, light emitted from a light source of a radiation part is reflected by the workpiece. The light reflected by the workpiece is imaged on a light receiving surface (an imaging surface) of a light receiving part (for example, an imaging element), by an image forming lens.

In the triangulation sensor described above, unevenness may occur in the distribution of the light received by the light receiving part, resulting in a positional variation. Therefore, in order to suppress the unevenness in the distribution of the light, application of the technique disclosed in Japanese Patent Publication No. 4503902 below may be considered. Patent Document 1 discloses a technique in which a grating is irradiated with light from a light source to generate fringes, and a phase of the fringes is detected by a light receiving part to measure the position of the light source.

However, when the above-described technique is applied, the period of the fringes detected by the light receiving part changes depending on a position of the workpiece. Therefore, when the workpiece is displaced, there is a deviation between the period of the detection elements that detect the fringes on the light receiving part and the period of the fringes, resulting in a decrease in detection accuracy.

BRIEF SUMMARY OF THE INVENTION

The present disclosure focuses on these points, and an object of the present disclosure is to suppress a change in the period of fringes detected by a light receiving part even when a workpiece is displaced.

The first aspect of the present disclosure provides a displacement sensor including a radiation part that irradiates a workpiece displaceable in a predetermined displacement direction with light, a light receiving part that receives a reflected light generated when the light radiated by the radiation part is reflected on the workpiece, and a fringe generation part that includes a generation means for generating fringes on a light receiving surface of the light receiving part when the light receiving part receives the reflected light from the workpiece, wherein the fringe generation part and the light receiving part are arranged such that the fringe generation part and the light receiving part are parallel to the displacement direction, or parallel to a virtual image of the displacement direction.

DETAILED DESCRIPTION OF THE INVENTION

First Embodiment (A Configuration of a Displacement Sensor)

A configuration of a displacement sensor 10 according to the first embodiment will be described referring to FIG. 1.

Figure 1:
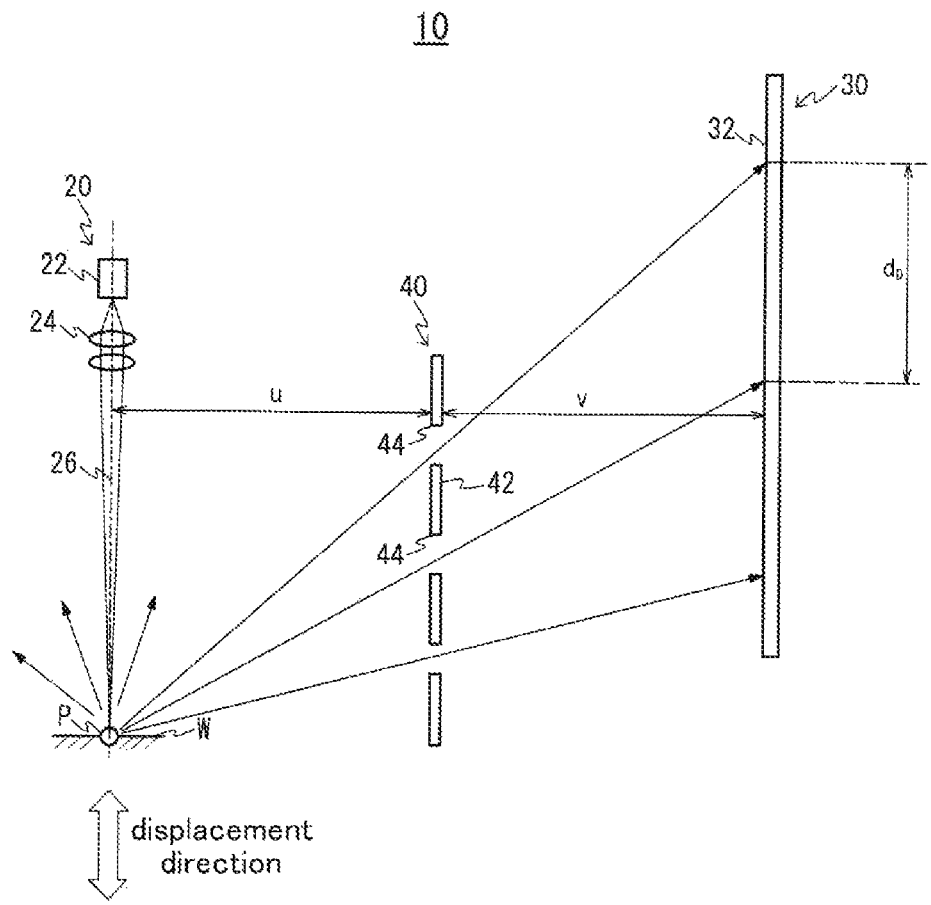
FIG. 1 is a schematic diagram for explaining a configuration of a displacement sensor 10 according to the first embodiment.

FIG. 1 is a schematic diagram for explaining the configuration of the displacement sensor 10 according to the first embodiment. The displacement sensor 10 irradiates a workpiece W with light to measure a distance (displacement) to the workpiece W. The displacement sensor 10 is a triangulation sensor. The displacement sensor 10 includes a radiation part 20, a light receiving part 30, and a fringe generation part 40, as shown in FIG. 1.

The radiation part 20 irradiates the workpiece W with the light. For example, the radiation part 20 radiates linear light downward to the workpiece W. The workpiece W is displaced in a vertical direction as a predetermined displacement direction. The radiation part 20 radiates the light to the workpiece W, which is displaced by moving in the vertical direction along a radiation plane 26. The radiation plane 26 is a plane including an optical axis of the light radiated by the radiation part 20.

The radiation part 20 includes a light source 22 and a lens 24. The light source 22 emits a laser beam having a predetermined wavelength. The lens 24 is a collimator lens or a rod lens, for example, and radiates the light emitted from the light source 22 as the linear light to the workpiece W. The light radiated from the radiation part 20 is reflected by the workpiece W (specifically, a radiation point P). Reflected light from the workpiece W is scattered as shown in FIG. 1.

The light receiving part 30 receives the reflected light generated when the light radiated by the radiation part 20 is reflected on the workpiece W. The light receiving part 30 includes a light receiving surface 32 for receiving the reflected light (specifically, fringes generated by the fringe generation part 40 using the reflected light). The light receiving surface 32 receives the reflected light at a position corresponding to the distance (the displacement) from the displacement sensor 10 to the workpiece W. Therefore, when the position on the light receiving surface 32 that receives the reflected light can be specified, the displacement of the workpiece W is detected. The light receiving surface 32 is positioned such that the light receiving surface 32 is parallel to the displacement direction (the vertical direction) of the workpiece W.

The light receiving part 30 is an image sensor for imaging the fringes, for example. As an example, the light receiving part 30 includes a CMOS light receiving element.

The fringe generation part 40 has a generation means for receiving the reflected light from the workpiece W located at one position and generating the fringes on the light receiving surface 32 of the light receiving part 30. For example, the fringe generation part 40 receives a plurality of rays of reflected light (three reflected lights in FIG. 1), and generates interference fringes at a plurality of positions on the light receiving surface 32. By generating the fringes on the light receiving surface 32, unevenness in the light distribution can be suppressed, and so the displacement of the workpiece W can be appropriately detected. The fringes are generated on the light receiving surface 32 at a predetermined period $d_D$.

Figure 2A:
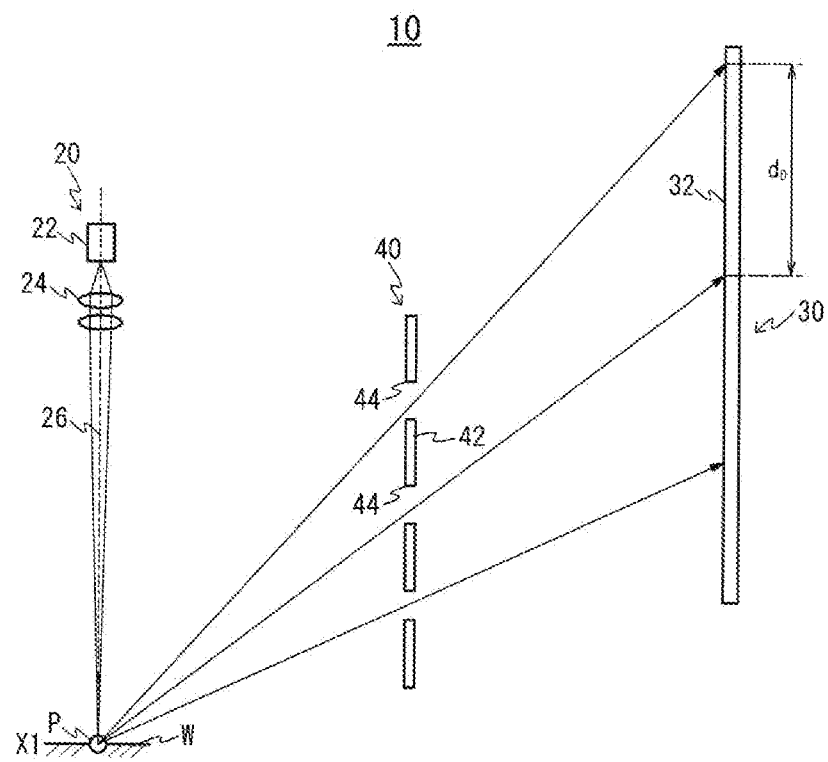
FIGS. 2A and 2B are schematic diagrams for explaining the period dD of fringes when a workpiece W is displaced.
Figure 2B:
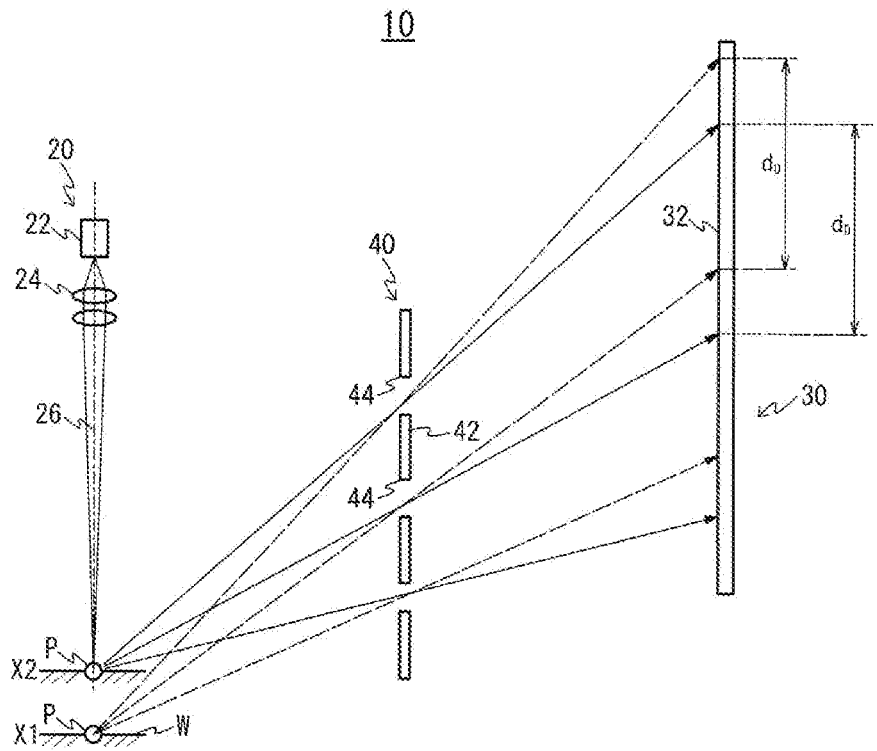

FIGS. 2A and 2B are schematic diagrams for explaining the period $d_D$, of fringes when the workpiece W is displaced. FIG. 2A shows the workpiece W located at a position X1 and FIG. 2B shows the workpiece W located at a position X2. It can be seen from FIGS. 2A and 2B that, when the workpiece W is moved from the position X1 to the position X2, the positions of the fringes on the light receiving surface 32 are moved. On the other hand, even when the workpiece W moves from the position X1 to the position X2, the period $d_D$ of the fringes has the same size.

The fringe generation part 40 includes a diffraction grating 42 here. As shown in FIG. 1, a plurality of apertures 44 are arranged at predetermined intervals in the diffraction grating 42. In the present embodiment, the apertures 44 correspond to the generation means for generating fringes. The apertures 44 are a transmission portion through which the reflected light from the workpiece W passes, and a portion of the diffraction grating 42 other than the apertures 44 is a non-transmission portion through which the reflected light does not pass. The diffraction grating 42 utilizes diffraction to generate the interference fringes.

As shown in FIG. 1, the fringe generation part 40 according to the present embodiment is arranged such that the diffraction grating 42 is parallel to the displacement direction (the vertical direction) of the workpiece W. In other words, the fringe generation part 40 is arranged such that the diffraction grating 42 is parallel to the radiation plane 26 of the radiation part 20. Therefore, the diffraction grating 42 is also parallel to the light receiving surface 32 of the light receiving part 30. Here, a) a distance u between the fringe generation part 40 (the diffraction grating 42) and the radiation point P (the radiation plane 26) and b) a distance v between the fringe generation part 40 and the light receiving surface 32 are different.

In the first embodiment, the fringe generation part 40 and the light receiving part 30 are arranged parallel to the displacement direction of the workpiece W, and so the distance u between the radiation point P on the workpiece W and the fringe generation part 40 does not change even when the workpiece W is displaced. Therefore, the period of the fringes generated on the light receiving surface 32 of the light receiving part 30 does not change even when the workpiece W is displaced.

Figure 3:
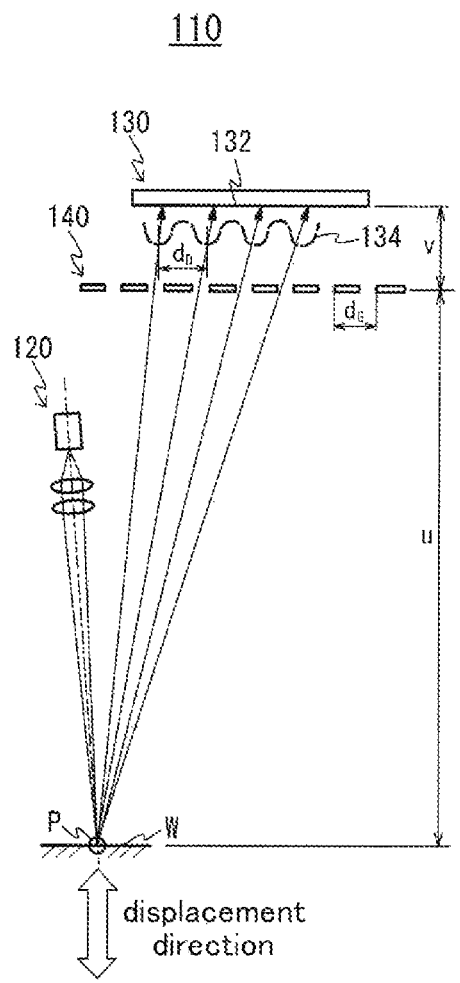
FIG. 3 is a schematic diagram for explaining a displacement sensor 110 according to a comparative example.

FIG. 3 is a schematic diagram for explaining a displacement sensor 110 according to a comparative example. The displacement sensor 110 according to the comparative example includes a radiation part 120, a light receiving part 130, and a fringe generation part 140. The radiation part 120 has a configuration similar to that of the radiation part 20 of the displacement sensor 10 shown in FIG. 1. On the other hand, the arrangement of the light receiving part 130 and the fringe generation part 140 with respect to the workpiece W differs from the arrangement of the light receiving part 30 and the fringe generation part 40 of the displacement sensor 10 with respect to the workpiece W. That is, the light receiving part 130 and the fringe generation part 140 are arranged orthogonally to the displacement direction of the workpiece W. This configuration differs from the configuration of light receiving part 30 and the fringe generation part 40, which are arranged parallel to the displacement direction of the workpiece W.

In the configuration according to the comparative example, the period $d_D$ of fringes 134 generated on a light receiving surface 132 is represented by the following equation (1).

$$d_D = \frac{v+u}{u} \times d_G \qquad (1)$$

In equation (1), u is a distance between the radiation point P and the fringe generation part 140, v is a distance between the fringe generation part 140 and the light receiving surface 132, and $d_G$ is a lattice constant of the diffraction grating 142.

In the comparative example, when the workpiece W is displaced in the displacement direction (the vertical direction), the distance u between the radiation point P on the workpiece W and the fringe generation part 140 changes, and therefore, the period $d_D$ of the fringes 134 changes, as apparent from the equation (1). As a result, there is a deviation between a) the period of the fringes 134 generated on the light receiving surface 132 and b) the period of the detecting elements placed on the light receiving surface 132, and so the fringes 134 cannot be detected with high accuracy.

In contrast, in the displacement sensor 10 according to the first embodiment, the distance u between the radiation point P on the workpiece W and the fringe generation part 40 does not change even when the workpiece W is displaced. The distance v between the fringe generation part 40 and the light receiving surface 32 also does not change. Therefore, as shown in FIGS. 2A and 2B, the period of the fringes generated on the light receiving surface 32 does not change even when the workpiece W is displaced. Consequently, since there is no deviation between the period of the fringes and the period of the detection elements on the light receiving surface 32, the fringes can be detected accurately even when the workpiece W is displaced.

(Configuration of a Profile Measurement Apparatus)

A configuration of a profile measurement apparatus 1 including the displacement sensor 10 with the above-described configuration will be described referring to FIG. 4.

Figure 4:
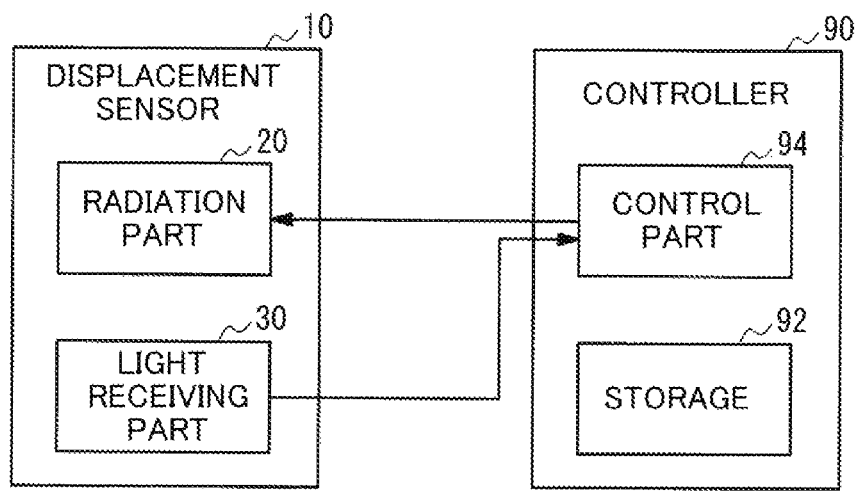
FIG. 4 is a schematic diagram for explaining a configuration of a profile measurement apparatus 1.

FIG. 4 is a schematic diagram for explaining the configuration of the profile measurement apparatus 1. The profile measurement apparatus 1 is an apparatus for measuring the profile of the workpiece W on the basis of a detection result of the displacement sensor 10. The profile measurement apparatus 1 includes a displacement sensor 10 and a controller 90, as shown in FIG. 4.

The displacement sensor 10 functions as a non-contact optical probe for measuring position coordinates and the like of each part of the workpiece W, in the profile measurement apparatus 1. Since the configuration of the displacement sensor 10 has the configuration shown in FIG. 1 described above, a detailed description thereof is omitted here.

The controller 90 controls an operation of the displacement sensor 10 (specifically, the radiation part 20 and the light receiving part 30). Further, the controller 90 controls a driving source for moving the workpiece W in the displacement direction (vertical direction), for example, and may move the workpiece W. The controller 90 includes a storage 92 and a control part 94.

The storage 92 includes a Read Only Memory (ROM) and a Random Access Memory (RAM), for example. The storage 92 stores a program that can be executed by the control part 94 and various types of data. For example, the storage 92 stores the result of the detection by the displacement sensor 10.

The control part 94 is a Central Processing Unit (CPU), for example. The control part 94 controls the operation of the displacement sensor 10 by executing the program stored in the storage 92.

The control part 94 controls the radiation of light to the workpiece W by the light source 22 of the radiation part 20. Further, the control part 94 acquires an output of the light receiving part 30, and calculates the profile of the workpiece W. That is, the control part 94 functions as a calculation part for calculating the profile of the workpiece W on the basis of the output of the light receiving part 30 of the displacement sensor 10.

Effects in the First Embodiment

In the displacement sensor 10 according to the first embodiment, the light receiving part 30 and the fringe generation part 40 are arranged such that they are parallel to the displacement direction of the workpiece W.

Thus, even when the workpiece W is displaced, a) the distance u between the radiation point P on the workpiece W and the fringe generation part 40 and b) the distance v between the fringe generation part 40 and the light receiving part 30 do not change, and so the period of the fringes generated on the surface 32 of the light receiving part 30 does not change. Consequently, since deviation does not occur between the period of the fringes and the period of the detecting elements of the light receiving surface 32, the fringes can be accurately detected even when the workpiece W is displaced.

Second Embodiment

The configuration of the displacement sensor 10 according to the second embodiment will be described referring to FIG. 5.

There is a difference that the generation means is a stepped part in the second embodiment while the generation means of the fringe generation part 40 according to the first embodiment is the aperture 44 of the diffraction grating 42.

Figure 5:
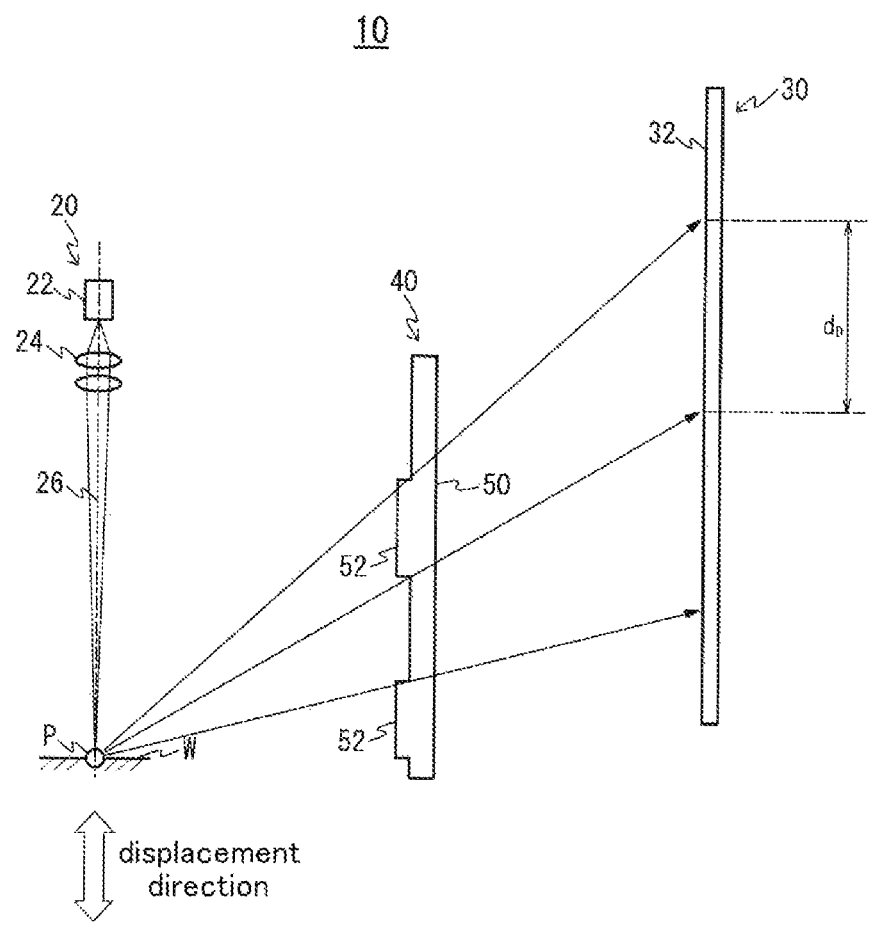
FIG. 5 is a schematic diagram for explaining the configuration of the displacement sensor 10 according to the second embodiment.

FIG. 5 is a schematic diagram for explaining the configuration of the displacement sensor 10 according to the second embodiment. As shown in FIG. 5, the displacement sensor 10 according to the second embodiment includes the radiation part 20, the light receiving part 30, and the fringe generation part 40. The configurations of the radiation part 20 and the light receiving part 30 in the second embodiment are the same as those of the first embodiment, and therefore description thereof is omitted below.

The fringe generation part 40 includes a substrate 50 with a plurality of steps 52 instead of the diffraction grating 42 with the apertures. The substrate 50 has a transparent body and transmits the reflected light from the workpiece W. The steps 52 here are convex portions of the substrate 50. The substrate 50 is disposed such that the substrate 50 is parallel to the displacement direction of the workpiece W (in other words, the radiation plane 26). The fringe generation part 40 generates the fringes having the period $d_D$ on the light receiving surface 32.

It should be noted that, for convenience of explanation, the period of the fringes when the workpiece W is positioned at the position X1 is shown in FIG. 5, but the period of the fringes does not change even when the workpiece W is displaced.

By providing the substrate 50, the fringe generation part 40 generates the fringes on the light receiving surface 32 using the reflected light transmitted through the steps 52. In this process, a phase difference occurs between the reflected light transmitted through the steps 52 of the substrate 50 and the reflected light transmitted through portions other than the steps 52, causing interference in the reflected light. When the wavelength of the light radiated by the radiation part 20 is $\lambda$, the thicknesses of the steps 52 should be set such that the phase difference of the reflected light becomes $\lambda/2$.

In the second embodiment, the substrate 50 with the steps 52 is placed parallel to the displacement direction of the workpiece W, and so the period of the fringes generated on the light receiving surface 32 does not change even when the workpiece W is displaced, as in the first embodiment. As a result, there is no deviation between the period of the fringes and the period of the detection elements on the light receiving surface 32, so the fringes can be detected accurately even when the workpiece W is displaced.

Third Embodiment

The configuration of the displacement sensor 10 according to the third embodiment will be described with reference to FIG. 6.

In the first embodiment, a) the distance u between the fringe generation part 40 and the radiation point P and b) the distance v between the fringe generation part 40 and the light receiving surface 32 are of different lengths, while the two distances are of the same length in the third embodiment.

Figure 6:
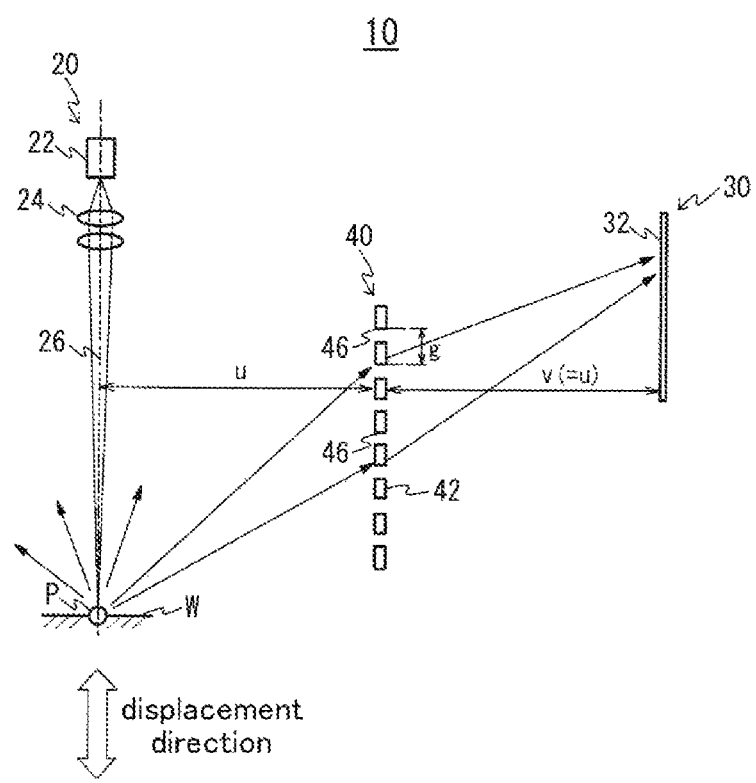
FIG. 6 is a schematic diagram for explaining the configuration of the displacement sensor 10 according to the third embodiment.

FIG. 6 is a schematic diagram for explaining the configuration of the displacement sensor 10 according to the third embodiment. The displacement sensor 10 according to the third embodiment includes the radiation part 20, the light receiving part 30, and the fringe generation part 40 as shown in FIG. 6. The configurations of the radiation part 20 and the light receiving part 30 according to the third embodiment are the same as those of the first embodiment.

The fringe generation part 40 according to the third embodiment includes a plurality of generation means arranged at predetermined intervals. For example, the fringe generation part 40 includes, as the generation means, a plurality of apertures 46 arranged at predetermined intervals in the diffraction grating 42. Here, it is assumed that the plurality of apertures 46 are arranged at a predetermined period g.

The fringe generation part 40 is located at an intermediate position between the radiation point P of the radiation part 20 and the light receiving surface 32. That is, the distance u between the fringe generation part 40 and the radiation point P has the same length as the distance v between the fringe generation part 40 and the light receiving surface 32.

As described above, when the plurality of apertures 46 are arranged at the predetermined period g and the distance u and the distance v have the same length, fringes having the period g are generated on the light receiving surface 32. That is, the period of apertures 46 and the period g of the fringes have the same size. Thus, by making the interval between the apertures 46 smaller, it is possible to generate fine fringes on the light receiving surface 32.

In the third embodiment, the fringe generation part 40 and the light receiving part 30 are arranged such that they are parallel to the displacement direction of the workpiece W. Therefore, even when the workpiece W is displaced in the displacement direction, the period g of the fringes does not change. As a result, there is no deviation between the period of the fringes and the period of the detection elements on the light receiving surface 32, so the fringes can be detected accurately even when the workpiece W is displaced.

Fourth Embodiment

The configuration of the displacement sensor 10 according to the fourth embodiment will be described with reference to FIG. 7.

There is a difference that the generation means of the fringe generation part 40 in the first embodiment is the apertures 44 of the diffraction grating 42, while the generation means is an image forming element in the fourth embodiment. The image forming element is an element having an image forming function for acquiring an image by utilizing an optical system.

Figure 7:
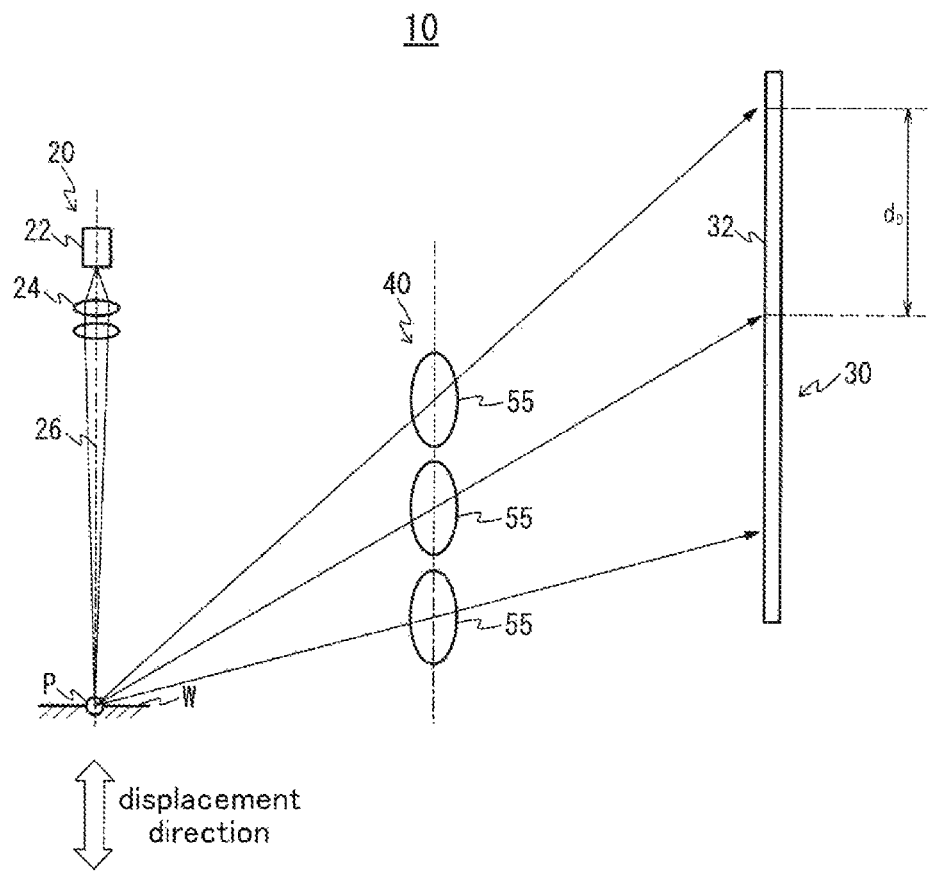
FIG. 7 is a schematic diagram for explaining the configuration of the displacement sensor 10 according to the fourth embodiment.

FIG. 7 is a schematic diagram for explaining the configuration of the displacement sensor 10 according to the fourth embodiment. The displacement sensor 10 according to the fourth embodiment includes the radiation part 20, the light receiving part 30, and the fringe generation part 40 as shown in FIG. 7. The configurations of the radiation part 20 and the light receiving part 30 according to the fourth embodiment are the same as those of the first embodiment.

The fringe generation part 40 includes a plurality of image forming elements 55 arranged adjacent to each other as the generation means. Specifically, as shown in FIG. 7, three image forming elements 55 are arranged such that they are parallel to the displacement direction of the workpiece W. Thus, even when the workpiece W is displaced, the fringes can be generated on the light receiving surface 32 by the three image forming elements 55. In the above description, the three image forming elements 55 are provided, but the present invention is not limited thereto, and four or more image forming elements 55 may be provided.

The plurality of image forming elements 55 are focusing lenses, for example. When the focusing lens is used, the power of the light received by the light receiving surface 32 is large. It should be noted that the image forming element 55 is the focusing lens in the above description, but the present invention is not limited thereto. For example, the image forming element 55 may be another lens, such as a Fresnel lens, or a diffractive optical element such as a Fresnel zone plate. Thus, the image forming element 55 with a small thickness can be provided.

In the fourth embodiment, the fringe generation part 40 and the light receiving part 30 are arranged such that they are parallel to the displacement direction of the workpiece W. Therefore, even when the workpiece W is displaced in the displacement direction, the period of the fringes does not change. As a result, there is no deviation between the period of the fringes and the period of the detection elements on the light receiving surface 32, so the fringes can be detected accurately even when the workpiece W is displaced.

Fifth Embodiment

The configuration of the displacement sensor 10 according to the fifth embodiment will be described with reference to FIG. 8.

There is a difference that the fringe generation part 40 includes the single diffraction grating 42 in the first embodiment, while the fringe generation part 40 includes a plurality of diffraction gratings in the fifth embodiment.

Figure 8:
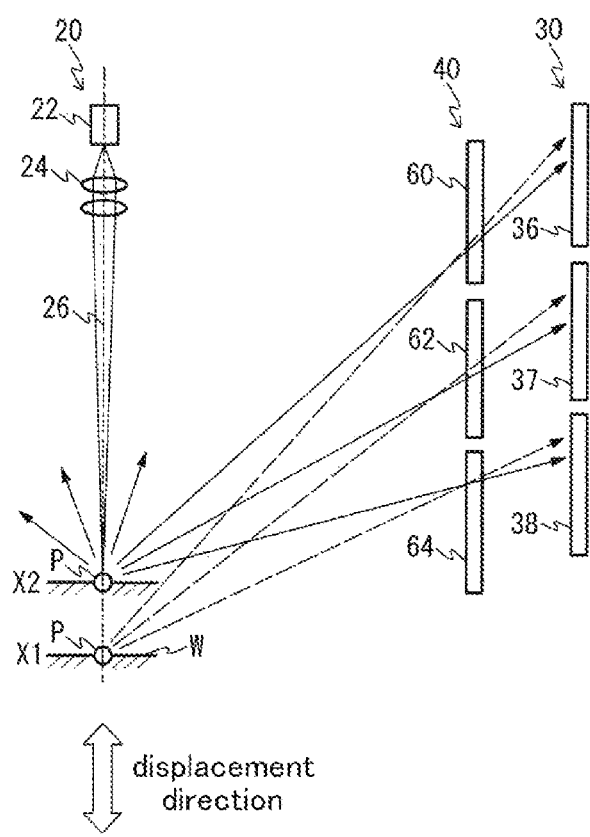
FIG. 8 is a schematic diagram for explaining the configuration of the displacement sensor 10 according to the fifth embodiment.

FIG. 8 is a schematic diagram for explaining the configuration of the displacement sensor 10 according to the fifth embodiment. The displacement sensor 10 according to the fifth embodiment includes the radiation part 20, the light receiving part 30, and the fringe generation part 40 as shown in FIG. 8. The configuration of the radiation part 20 according to the fifth embodiment is the same as that of the first embodiment.

The fringe generation part 40 according to the fifth embodiment includes the plurality of diffraction gratings with a plurality of generating means formed therein. For example, the fringe generation part 40 includes a first diffraction grating 60, a second diffraction grating 62, and a third diffraction grating 64. The first diffraction grating 60, the second diffraction grating 62, and the third diffraction grating 64 are arranged in a row such that they are parallel to the displacement direction of the workpiece W.

It is illustrated in simplified form in FIG. 8, but the first diffraction grating 60, the second diffraction grating 62, and the third diffraction grating 64 include a plurality of apertures similarly to the above-described diffraction grating 42. The first diffraction grating 60 includes apertures arranged with a first period, the second diffraction grating 62 includes apertures arranged with a second period, and the third diffraction grating 64 includes apertures arranged with a third period. Lengths of the first period, the second period, and the third period are different from each other. That is, the intervals between apertures of the first diffraction grating 60, the second diffraction grating 62, and the third diffraction grating 64 are different from each other.

The light receiving part 30 includes a plurality of light receiving surfaces corresponding to the plurality of diffraction gratings of the fringe generation part 40. For example, the light receiving part 30 includes a first light receiving surface 36, a second light receiving surface 37, and a third light receiving surface 38. The first light receiving surface 36, the second light receiving surface 37, and the third light receiving surface 38 are arranged in a row such that they are parallel to the displacement direction of the workpiece W.

The fringes are generated on the first light receiving surface 36 by the first diffraction grating 60, the fringes are generated on the second light receiving surface 37 by the second diffraction grating 62, and the fringes are generated on the third light receiving surface 38 by the third diffraction grating 64. The periods of the fringes generated on the first light receiving surface 36, the second light receiving surface 37, and the third light receiving surface 38 are different from each other. This allows the first light receiving surface 36, the second light receiving surface 37, and the third light receiving surface 38 to output signals of different wavelengths. By outputting the signals of different wavelengths, the absolute position of the workpiece W can be obtained.

In the fifth embodiment, the fringe generation part 40 and the light receiving part 30 are arranged such that they are parallel to the displacement direction of the workpiece W. Therefore, even when the workpiece W is displaced in the displacement direction, the period of the fringes does not change. As a result, there is no deviation between the period of the fringes and the period of the detection elements on the light receiving surface 32, so the fringes can be detected accurately even when the workpiece W is displaced.

Sixth Embodiment

The configuration of the displacement sensor 10 according to the sixth embodiment will be described with reference to FIG. 9.

There is a difference that the light receiving part 30 includes an image sensor in the first embodiment, while the light receiving part 30 includes a photodiode array arranged with a plurality of photodiodes in the sixth embodiment.

Figure 9:
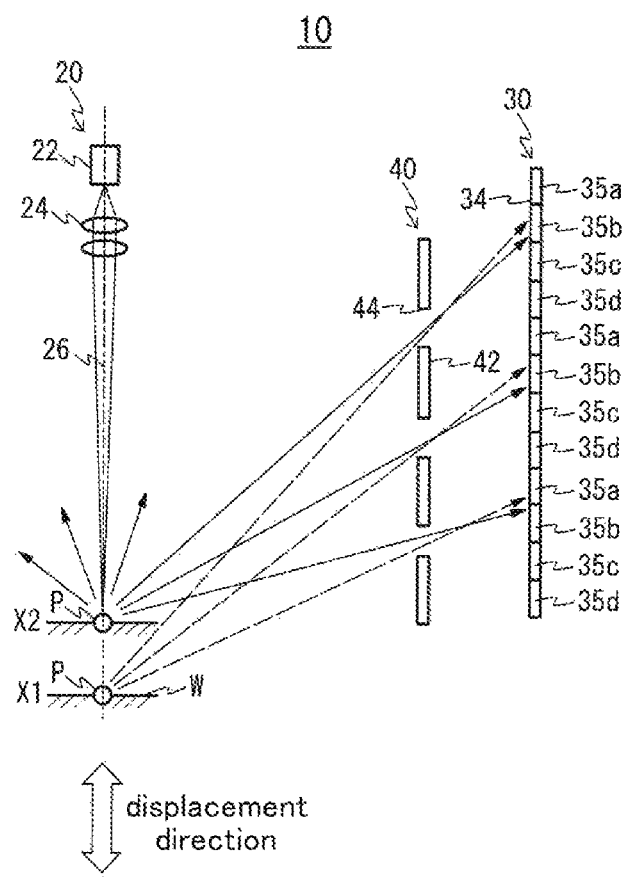
FIG. 9 is a schematic diagram for explaining the configuration of the displacement sensor 10 according to the sixth embodiment.

FIG. 9 is a schematic diagram for explaining the configuration of the displacement sensor 10 according to the sixth embodiment. The displacement sensor 10 according to the sixth embodiment includes the radiation part 20, the light receiving part 30, and the fringe generation part 40 as shown in FIG. 9. The configurations of the radiation part 20 and the fringe generation part 40 according to the sixth embodiment are the same as those of the first embodiment.

The light receiving part 30 according to the sixth embodiment includes a photodiode array 34 with a plurality of photodiodes 35a to 35d arranged therein. The photodiodes 35a to 35d are optical detectors for detecting light. The photodiodes 35a to 35d are arranged in a row such that they are parallel to the radiation plane 26. Further, the photodiodes 35a to 35d are arranged alternately.

The photodiodes 35a to 35d output current as analog outputs. Therefore, the responsiveness of the light receiving part 30 is fast, thereby enabling fast detection. Further, when the photodiodes 35a to 35d are used for the light receiving part 30, the amount of heat generation can be suppressed as compared with a case where the image sensor is used.

The light receiving part 30 can determine an amount of displacement of the fringes generated due to the displacement of the workpiece W by determining a) the difference (the displacement) between the outputs of the photodiode 35a and the photodiode 35c and b) the difference (the displacement) between the outputs of the photodiode 35b and the photodiode 35d. It should be noted that as the above-described difference increases, the amount of displacement also increases.

In the sixth embodiment, the fringe generation part 40 and the light receiving part 30 are arranged such that they are parallel to the displacement direction of the workpiece W. Therefore, even when the workpiece W is displaced in the displacement direction, the period of the fringes does not change. As a result, since there is no deviation between the period of the fringes and the period of the detection elements on the light receiving surface 32, the fringes can be detected accurately even when the workpiece W is displaced.

Seventh Embodiment

The configuration of the displacement sensor 10 according to the seventh embodiment will be described with reference to FIG. 10.

The difference is that, in the first embodiment, the plurality of generation means (the apertures of the diffraction grating 42) of the fringe generation part 40 are arranged with the predetermined period, while in the seventh embodiment, the plurality of generation means are arranged so that the intervals between the adjacent generation means are random.

Figure 10:
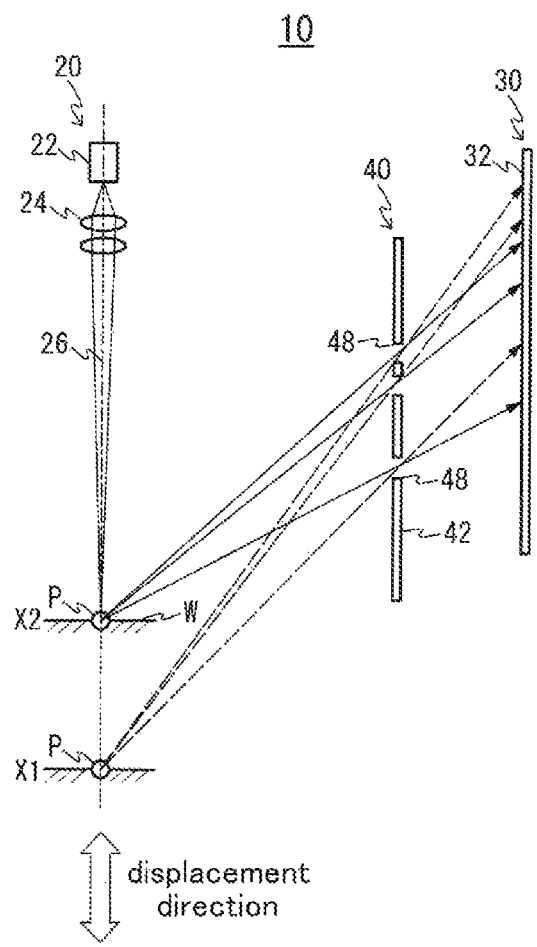
FIG. 10 is a schematic diagram for explaining the configuration of the displacement sensor 10 according to the seventh embodiment.

FIG. 10 is a schematic diagram for explaining the configuration of the displacement sensor 10 according to the seventh embodiment. The displacement sensor 10 according to the seventh embodiment includes the radiation part 20, the light receiving part 30, and the fringe generation part 40 as shown in FIG. 10. The configurations of the radiation part 20 and the light receiving part 30 according to the seventh embodiment are the same as those of the first embodiment.

The fringe generation part 40 according to the seventh embodiment includes the diffraction grating 42 arranged in such a way that the intervals between a plurality of apertures 48 are random. For example, a pseudo-random code called a Maximum length sequence (M-sequence) code can be applied as a random arrangement of the plurality of apertures 48. The M-sequence code is made up of a) an n-stage shift register and b) the longest sequence among the sequences calculated by addition.

For each position of the workpiece W, three light receiving positions on the light receiving surface 32 that receive the fringes are different and do not overlap.

The controller 90 of the profile measurement apparatus 1 of FIG. 4 specifies the displacement of the workpiece W by matching a) the three light receiving positions that receive the fringes outputted by the light receiving part 30 with b) patterns of light receiving positions stored in the storage 92 in advance.

The storage 92 stores a plurality of patterns that indicates the light receiving positions on the light receiving surface 32 that receives the fringes (specifically, the three light receiving positions that receive the fringes). The plurality of storage patterns stored in the storage 92 is measured in advance, and includes the three light receiving positions that do not overlap with each other.

The control part 94 acquires the three light receiving positions that receive the fringes from the light receiving part 30. The control part 94 determines which of the plurality of storage patterns stored in the storage 92 matches the acquired three light receiving positions. The control part 94 selects the storage pattern with the highest degree of matching, and detects the displacement on the basis of the selected storage pattern.

In the seventh embodiment, the fringe generation part 40 and the light receiving part 30 are arranged such that they are parallel to the displacement direction of the workpiece W. Therefore, even when the workpiece W is displaced in the displacement direction, the period of the fringes does not change. As a result, there is no deviation between the period of the fringes and the period of the detection elements on the light receiving surface 32, so the fringes can be detected accurately even when the workpiece W is displaced.

Further, in the seventh embodiment, since the plurality of image forming means are randomly arranged such that the light receiving positions on the light receiving surface 32 that receive the fringes do not overlap, the displacement of the workpiece W is accurately specified.

It should be noted that, when the workpiece W shown in FIG. 10 has a transparent body, even if the transparent body has a plurality of measurement points thereon, adopting the above-described configuration enables separation of the plurality of measurement points on the transparent body. For example, when the position X1 of FIG. 10 is a back surface of the transparent body and the position X2 is a front surface of the transparent body, the front surface and the back surface of the transparent body can be separately specified.

Eighth Embodiment

The configuration of the displacement sensor 10 according to the eighth embodiment will be described referring to FIG. 11.

Figure 11:
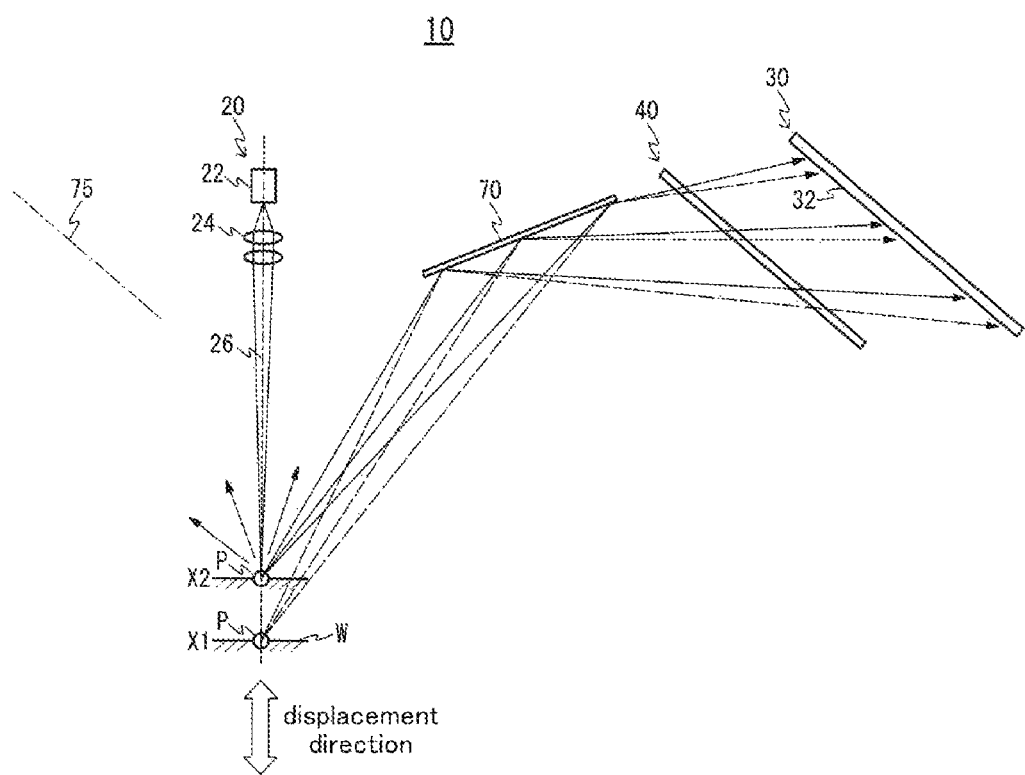
FIG. 11 is a schematic diagram for explaining the configuration of the displacement sensor 10 according to the eighth embodiment.

FIG. 11 is a schematic diagram for explaining the configuration of the displacement sensor 10 according to the eighth embodiment. The displacement sensor 10 includes a reflection member 70 in addition to the radiation part 20, the light receiving part 30, and the fringe generation part 40 as shown in FIG. 11.

The reflection member 70 is a member for reflecting the reflected light from the workpiece W toward the fringe generation part 40. The reflection member 70 is a mirror, for example, and is arranged such that the direction of the surface intersects with the displacement direction of the workpiece W. In the displacement direction of the workpiece W, the reflection member 70 is disposed near the radiation part 20.

The fringe generation part 40 and the light receiving part 30 according to the first embodiment are arranged so as to be parallel to the displacement direction of the workpiece W, whereas the fringe generation part 40 and the light receiving part 30 according to the eighth embodiment are arranged such that the directions thereof intersect with the displacement direction of the workpiece W. On the other hand, the fringe generation part 40 and the light receiving part 30 according to the eighth embodiment are arranged such that they are parallel to a virtual image of the displacement direction of the workpiece W.

FIG. 11 shows a virtual image 75 of the displacement direction of the workpiece W. The virtual image 75 is a virtual image generated at a position that is line-symmetrical to the displacement direction (vertical direction) of the workpiece W about the longitudinal line of the reflection member 70 in FIG. 11. The fringe generation part 40 and the light receiving part 30 each are arranged such that they are parallel to the virtual image 75. Further, the fringe generation part 40 and the light receiving part 30 are disposed at substantially the same position as the reflecting member 70 in the vertical direction.

In the eighth embodiment, since the fringe generation part 40 and the light receiving part 30 are arranged such that they are parallel to the virtual image 75 in the displacement direction of the workpiece W, the period of the fringes does not change even when the workpiece W is displaced in the displacement direction. As a result, there is no deviation between the period of the fringes and the period of the detection elements on the light receiving surface 32, so the fringes can be detected accurately even when the workpiece W is displaced.

In addition, in the case of the eighth embodiment, providing the reflection member 70 makes it easier to position the displacement sensor 10 away from the workpiece W. That is, in the displacement direction of the workpiece W, the fringe generation part 40 and the light receiving part 30 are located near the workpiece W in the first embodiment, whereas the fringe generation part 40, the light receiving part 30, and the reflection member 70 are located away from the workpiece W in the eighth embodiment.

Ninth Embodiment

The configuration of the displacement sensor 10 according to the ninth embodiment will be described referring to FIG. 12.

The difference is that the radiation part 20 according to the first embodiment irradiates the workpiece W with spot light, whereas the radiation part 20 irradiates the workpiece W with a line beam that is line-shaped light in the ninth embodiment. As an example, the radiation part 20 according to the ninth embodiment includes a cylindrical lens for converting the laser beam radiated by the light source 22 (see FIG. 1) into the line beam.

Figure 12:
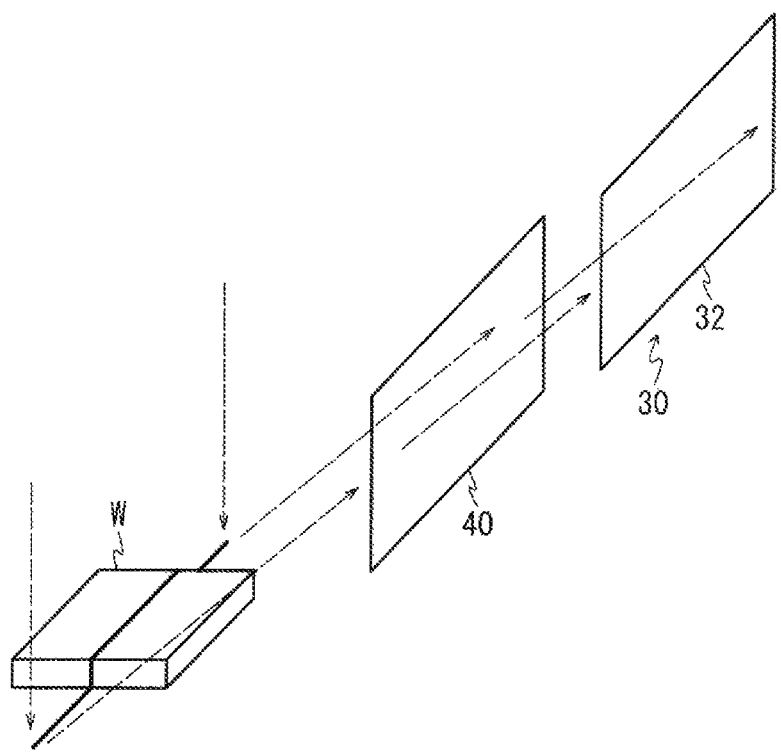
FIG. 12 is a schematic diagram for explaining the configuration of the displacement sensor 10 according to the ninth embodiment.

FIG. 12 is a schematic diagram for explaining the configuration of the displacement sensor 10 according to the ninth embodiment. In FIG. 12, a thick line shows the line beam. Here, the line beam irradiates the workpiece W such that the width of the line beam is wider than the width of the workpiece W. The fringe generation part 40 receives the reflected light (hereinafter, reflected line beam) from the workpiece W, and generates the fringes on the light receiving surface 32 of the light receiving part 30. The fringe generation part 40 includes, as a means for generating fringes, the above-described diffraction grating 42 and step 52, for example.

The light receiving surface 32 of the light receiving part 30 can detect, in two orthogonal axis directions, the position of the fringes generated by the fringe generation part 40. The light receiving surface 32 is provided with an area sensor capable of detecting the position in the two orthogonal axis directions, for example.

Also in the ninth embodiment, the fringe generation part 40 and the light receiving part 30 are arranged such that they are parallel to the displacement direction of the workpiece W. Therefore, even when the workpiece W is displaced in the displacement direction, the period of the fringes does not change. As a result, there is no deviation between the period of the fringes and the period of the detection elements on the light receiving surface 32, so the fringes can be detected accurately even when the workpiece W is displaced.

Further, in the ninth embodiment, the displacement of the entire workpiece W can be detected at once by irradiating the workpiece W with the line beam.

The present invention is explained on the basis of the exemplary embodiments. The technical scope of the present invention is not limited to the scope explained in the above embodiments and it is possible to make various changes and modifications within the scope of the invention. For example, all or part of the apparatus can be configured to be functionally or physically distributed and integrated in arbitrary units. Further, new exemplary embodiments generated by arbitrary combinations of them are included in the exemplary embodiments of the present invention. The effect of the new embodiment caused by the combination has the effect of the original embodiment together.

What is claimed is:

1. A displacement sensor comprising:
   a radiation emitter configured to irradiate a workpiece displaceable in a predetermined displacement direction with light;
   a light receiver configured to receive a reflected light generated when the light radiated by the radiation emitter is reflected on the workpiece; and
   a fringe generator configured to generate fringes on a light receiving surface of the light receiver when the light receiver receives the reflected light from the workpiece, wherein the displacement direction is a direction along an optical axis of the light that the radiation emitter is configured to irradiate the workpiece with, and the fringe generator and the light receiver are arranged such that the fringe generator and the light receiver are parallel to the displacement direction, or parallel to a virtual image of the displacement direction.

2. The displacement sensor according to claim 1, wherein the fringe generator includes a diffraction grating with a plurality of apertures, and the fringe generator is configured to generate fringes on the light receiving surface with the reflected light passing through the apertures.

3. The displacement sensor according to claim 1, wherein the fringe generator includes a substrate on which a plurality of steps are formed, and the fringe generator is configured to generate fringes on the light receiving surface with the reflected light transmitted through the steps.

4. The displacement sensor according to claim 1, wherein the fringe generator includes at least one of a plurality of diffraction gratings with a plurality of apertures, a plurality of substrates on which a plurality of steps are formed, and a plurality of image forming elements, arranged at predetermined intervals, and a distance between the fringe generator and a radiation plane of the radiation emitter has the same length as a distance between the fringe generator and the light receiving surface.

5. The displacement sensor according to claim 1, wherein the fringe generator includes a diffraction grating with a plurality of apertures, the plurality of apertures are arranged at predetermined intervals, and a distance between the fringe generator and a radiation plane of the radiation emitter has the same length as a distance between the fringe generator and the light receiving surface.

6. The displacement sensor according to claim 1, wherein the fringe generator includes a plurality of image forming elements arranged in a row adjacent to each other along the displacement direction.

7. The displacement sensor according to claim 1, wherein the fringe generator includes a plurality of diffraction gratings arranged to be parallel to the displacement direction or to the virtual image, and having a plurality of apertures formed therein, and the intervals between the apertures of the diffraction gratings are different from each other.

8. The displacement sensor according to claim 1, wherein the light receiver includes a photodiode array in which a plurality of photodiodes for detecting the reflected light are arrayed.

9. The displacement sensor according to claim 1, wherein at least one of a diffraction grating with a plurality of apertures, a substrate on which a plurality of steps are formed, and a plurality of image forming elements is arranged in such a way that the intervals between adjacent apertures of the plurality of apertures along the displacement direction are random.

10. The displacement sensor according to claim 9, wherein the fringe generator includes the diffraction grating in which a plurality of apertures are formed, and the plurality of apertures are arranged such that the intervals between the adjacent apertures are random.

11. The displacement sensor according to claim 1 further comprising:

a reflector configured to reflect the reflected light from the workpiece toward the fringe generator, wherein the fringe generator and the light receiver are arranged such that the fringe generator and the light receiver are parallel to a virtual image of the displacement direction as seen from the reflector.

12. The displacement sensor according to claim 1, wherein the radiation emitter is configured to irradiate the workpiece with line-shaped light, and the fringe generator is configured to generate fringes on the light receiving surface that can detect a position in two orthogonal axes.

13. The displacement sensor according to claim 1, wherein the radiation emitter is configured to irradiate the workpiece with spot light.

14. The displacement sensor according to claim 12, wherein the light source of the radiation emitter irradiates spot light and the lens of the radiation emitter converts the spot light into the line shaped light.

15. A non-contact optical probe comprising:

a radiation emitter configured to irradiate a workpiece displaceable in a predetermined displacement direction with light;

a light receiver configured to receive a reflected light generated when the light radiated by the radiation emitter is reflected on the workpiece; and a fringe generator configured to generate fringes on a light receiving surface of the light receiver when the light receiver receives the reflected light from the workpiece, wherein the displacement direction is a direction along an optical axis of the light that the radiation emitter is configured to irradiate the workpiece with, and the fringe generator and the light receiver are arranged such that the fringe generator and the light receiver are parallel to the displacement direction, or parallel to a virtual image of the displacement direction.

* * * * *